United States Patent
Sellhorn et al.

(10) Patent No.: US 10,533,441 B2
(45) Date of Patent: Jan. 14, 2020

(54) FLOATING INTERSTAGE SEAL ASSEMBLY

(71) Applicant: Rolls-Royce Corporation, Indianapolis, IN (US)

(72) Inventors: James E. Sellhorn, Indianapolis, IN (US); Michael Whitten, Zionsville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 116 days.

(21) Appl. No.: 15/611,992

(22) Filed: Jun. 2, 2017

(65) Prior Publication Data
US 2018/0347386 A1 Dec. 6, 2018

(51) Int. Cl.
*F16J 15/44* (2006.01)
*F01D 11/00* (2006.01)
*F16J 15/447* (2006.01)
*F01D 11/02* (2006.01)

(52) U.S. Cl.
CPC .......... *F01D 11/001* (2013.01); *F01D 11/025* (2013.01); *F16J 15/4472* (2013.01); *F05D 2230/642* (2013.01); *F05D 2260/36* (2013.01)

(58) Field of Classification Search
CPC .... F16J 15/447; F16J 15/4472; F16J 15/4474; F16J 15/4476; F01D 11/001; F01D 11/02; F01D 11/025
USPC .................. 277/409, 411, 413–421
See application file for complete search history.

(56) References Cited

U.S. PATENT DOCUMENTS

| | | | | |
|---|---|---|---|---|
| 957,286 | A * | 5/1910 | Wilson | F16K 3/243 123/188.4 |
| 5,908,195 | A * | 6/1999 | Sharrer | F16J 15/4474 277/348 |
| 6,116,612 | A * | 9/2000 | Halliwell | F01D 11/02 277/412 |
| 7,789,395 | B2 * | 9/2010 | Roddis | F16J 15/4478 277/400 |
| 7,806,410 | B2 * | 10/2010 | El-Aini | F01D 11/02 277/413 |
| 7,850,173 | B2 * | 12/2010 | Ivakitch | B23P 6/005 277/421 |
| 8,152,450 | B1 | 4/2012 | Aho | |
| 9,540,941 | B2 | 1/2017 | Janarthanan et al. | |
| 2008/0008582 | A1 | 1/2008 | Pickens et al. | |
| 2008/0075583 | A1 | 3/2008 | Schlienger et al. | |
| 2016/0003077 | A1 | 1/2016 | Banks et al. | |
| 2016/0024956 | A1 | 1/2016 | Dabbs et al. | |

* cited by examiner

*Primary Examiner* — Kristina R Fulton
*Assistant Examiner* — L. Susmitha Koneru
(74) *Attorney, Agent, or Firm* — Duane Morris LLP; Patrick Craig Muldoon

(57) ABSTRACT

A labyrinth seal system comprises a knife element and a stator element, the knife element having a plurality of teeth radially extending from a base and the stator element having a radially inner surface configured to interact with the plurality of teeth to create a seal. The knife element is axially constrained by and rotationally coupled to a turbine component, but has a degree of freedom in the radial direction with respect to that component.

17 Claims, 6 Drawing Sheets

FLOATING INTERSTAGE SEAL ASSEMBLY

FIELD OF THE DISCLOSURE

The present disclosure relates generally to seals for gas turbine engines and, more specifically, to a seal assembly in a multistage gas turbine engine for controlling interstage leakage.

BACKGROUND

In a gas turbine, a gas is compressed through successive stages in a compressor and mixed with fuel in a combustor. The combination of gas and fuel is then ignited for generating combustion gases that are directed to turbine stages to produce rotational motion. The turbine stages and compressor stages typically have stationary or non-rotary components, e.g., vanes, that cooperate with rotatable components, e.g., rotor blades, for compressing and expanding the operational gases.

Fluid leakage between stages reduces overall gas turbine engine performance and efficiency and therefore, interstage seals are provided to reduce such leakage. In general, fluid leakage is reduced when a gap between the seal and a rotor assembly is minimized. Labyrinth seals have been used to effect a seal between stages at different pressures in gas turbine engines. Such seals generally comprise two principal elements, i e, a rotatable seal and a static seal. The static seal comprises an annular member. The rotatable seal, as viewed in cross section parallel to the axial length of the engine, frequently has rows of thin labyrinth fingers or teeth extending radially from a relatively thicker base. The teeth of the rotatable seal extend radially to a location adjacent the static seal.

It is desirable to have sufficient contact between the labyrinth teeth and the static annular member such that a seal is formed between those components. However, if excessive contact or pressure between the labyrinth teeth and static annular member occurs, then either the teeth or annular member may be damaged. Conversely, insufficient contact between those components results in a failure of the seal. Thus it is desirable to maintain the rotatable and static portions of a labyrinth seal in an appropriate degree of contact with each other.

SUMMARY

The present application discloses one or more of the features recited in the appended claims and/or the following features that, alone or in any combination, may comprise patentable subject matter.

According to an aspect of the present invention, a labyrinth seal system comprises a plurality of teeth radially extending from a base, the plurality of teeth and base forming a concentric ring about an axis; a fixed stator disposed opposite and radially outward from the plurality of teeth, the fixed stator having an radially inner surface configured to interact with the plurality of teeth to create a seal between two cavities; and an axially forward turbine component and an axially aft turbine component. The concentric ring is constrained axially between the forward turbine component and the aft turbine component and rotationally coupled to one of the forward or aft turbine components. The concentric ring has a degree of freedom in the radial direction with respect to the forward and aft turbine components.

In some embodiments the concentric ring is thermally decoupled from the forward and aft turbine components. In some embodiments one of the forward and aft turbine components are selected from the group consisting of rotor disc, cover plate, bearing, shaft and spacer. In some embodiments the concentric ring is rotationally coupled to one of the forward or aft turbine components with a key and keyway arrangement.

In some embodiments the system further comprises a plurality of coaxial split rings engaged radially between the base and one of the forward and aft turbine components. In some embodiments the plurality of coaxial split rings are retained within a groove in the one of the forward and aft turbine components. In some embodiments the system further comprises a plurality of keys and respective keyways distributed circumferentially about the coaxial ring and one of the forward and aft turbine components.

In some embodiments the mass of the concentric ring is substantially less than the mass of the one of the forward and aft turbine components. In some embodiments the base comprises a radially inner surface oppositely disposed from an outer radial surface of the one forward and aft turbine components. In some embodiments the forward turbine component is a rotor disc and the aft turbine component is a cover plate. In some embodiments the thermal capacity of the concentric ring is substantially less than the thermal capacity of the one forward and aft turbine components.

According to another aspect of the present disclosure, a method of thermally decoupling a labyrinth seal from a turbine component comprises radially separating an inner radial surface of the labyrinth seal from an outer radial surface of a turbine component with a gap; restraining relative axial movement of the labyrinth seal with a fixed stop on the turbine component; and rotationally coupling the labyrinth seal to the turbine component. The radial movement of the labyrinth seal is unrestrained by the turbine component.

In some embodiments the method further comprises sealing the gap with a plurality of concentric split rings. In some embodiments the gap is an air gap. In some embodiments the step of rotationally coupling the labyrinth seal comprises locating a plurality of keys and corresponding keyway circumferentially about the labyrinth seal and the turbine component. In some embodiments the key and keyways are oriented longitudinally within planes containing the axis.

According to yet another aspect of the present disclosure, a method of maintaining a labyrinth seal in a dynamic temperature environment comprises thermally decoupling knifes of the labyrinth seal from a rotating turbine component; rotationally coupling the knifes of to the rotating turbine component; matching the thermal expansion rate of the knifes with a stator of the labyrinth seal. The knifes and the rotating turbine component are configured to allow relative radial movement.

In some embodiments the step of thermally decoupling knifes of the labyrinth seal comprises the step of providing an air gap between the radial inner surface of the knifes and the radially outer surface of the rotating turbine component. In some embodiments the step of matching the thermal expansion rate is a function of at least thermal coefficient of expansion and total thermal capacity of the respective knifes and stator. In some embodiments the turbine component is selected from the group consisting of rotor disc, cover plate, bearing, shaft and spacer.

BRIEF DESCRIPTION OF THE DRAWINGS

The following will be apparent from elements of the figures, that are provided for illustrative purposes and are not necessarily to scale.

Figure 1:
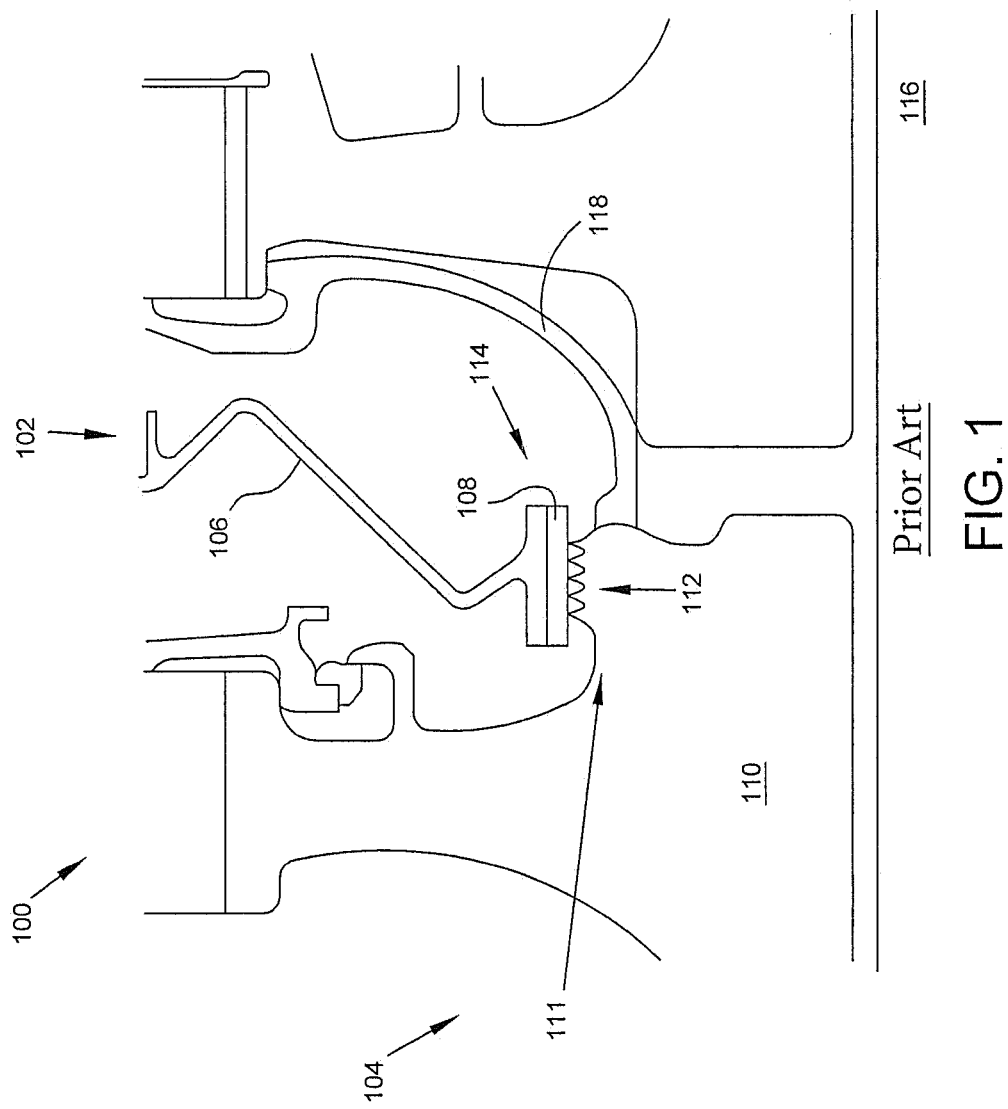
FIG. 1 is a cross-sectional side view of a typical interstage seal assembly in a turbine of a gas turbine engine.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

With reference to FIG. 1 a typical interstage seal assembly 100 of a turbine in a gas turbine engine is illustrated. Interstage seal assembly 100 comprises a stator portion 102 and a rotor portion 104. Stator portion 102 is disposed radially inward from and typically coupled to a stator vane (not shown). Stator portion 102 comprises a stator 106 and a sealing member 108. Rotor portion 104 comprises a rotor disk 110 forming a knife region 111 having a plurality of knife edges 112. Rotor disk 110 is rotatable about a shaft 116. Annular knife edges 112 in contact with the annular sealing member 108 form a labyrinth seal 114.

During operation, hot exhaust gases from the combustor are passed through the turbine in an axially forward-to-aft direction (from left to right in FIG. 1). As the stator portion 102 and rotor portion 104 are heated by the exhaust gases they expand. However, due to the different thermal capacities of the stator portion 102 and rotor portion 104, the sealing member 108 expands and contracts at a faster rate than the knife region 111. In other words, the rotor disk 110 acts as a heat sink to slow heating of the knife region 111, and since the sealing member 108 lacks a similar heat sink the knife region 111 and sealing member 108 have unequal expansion rates.

As a result of the unequal expansion rates, the sealing member 108—which is formed as an annular hoop—tends to expand and separate from the knife region 111, rendering the labyrinth seal 114 ineffective. Conversely, during cool down of the turbine the sealing member 108 tends to contract more quickly than knife region 111, creating excessive pressure between the components that can damage the knife region 111 and/or sealing member 108.

In alternative versions of the interstage seal assembly 100 of FIG. 1, the knife region 111 may be formed as part of a forward-extending arm of cover plate 118. The cover plate 118 may thus form one side of labyrinth seal 114 and may be in contact with rotor disk 110. In such assemblies, the aforementioned problems with unequal expansion rates are likely still present, as the knife region 111 is integrally formed with the cover plate 118 and therefore has a substantially larger thermal capacity than sealing member 108.

It is thus desirable to improve the effectiveness of labyrinth seal 114 over a wide range of operating conditions and transients and reduce the potential for damage to the labyrinth seal components by roughly matching the expansion and contraction rates of the sealing member 108 and knife region 111. In some embodiments the expansion and contraction rates are matched or substantially matched. In some embodiments the expansion and contraction rates are made to converge as compared to those seen in prior art systems and methods of interstage sealing.

The present disclosure is thus directed to an interstage seal assembly configured to overcome the deficiencies noted above, most significantly the poor sealing quality and potential damage to seal components caused by mismatched expansion and contraction rates of seal components. More specifically, the present disclosure is directed to an interstage seal assembly having the knife region separated and thermally isolated from other turbine components such as the rotor disks, cover plates, shafts, etc. The separate knife element has a similar thermal capacity as the sealing member and, depending on material of manufacture, may therefore have a more closely matched rate of expansion and contraction as the sealing member.

Figure 2:
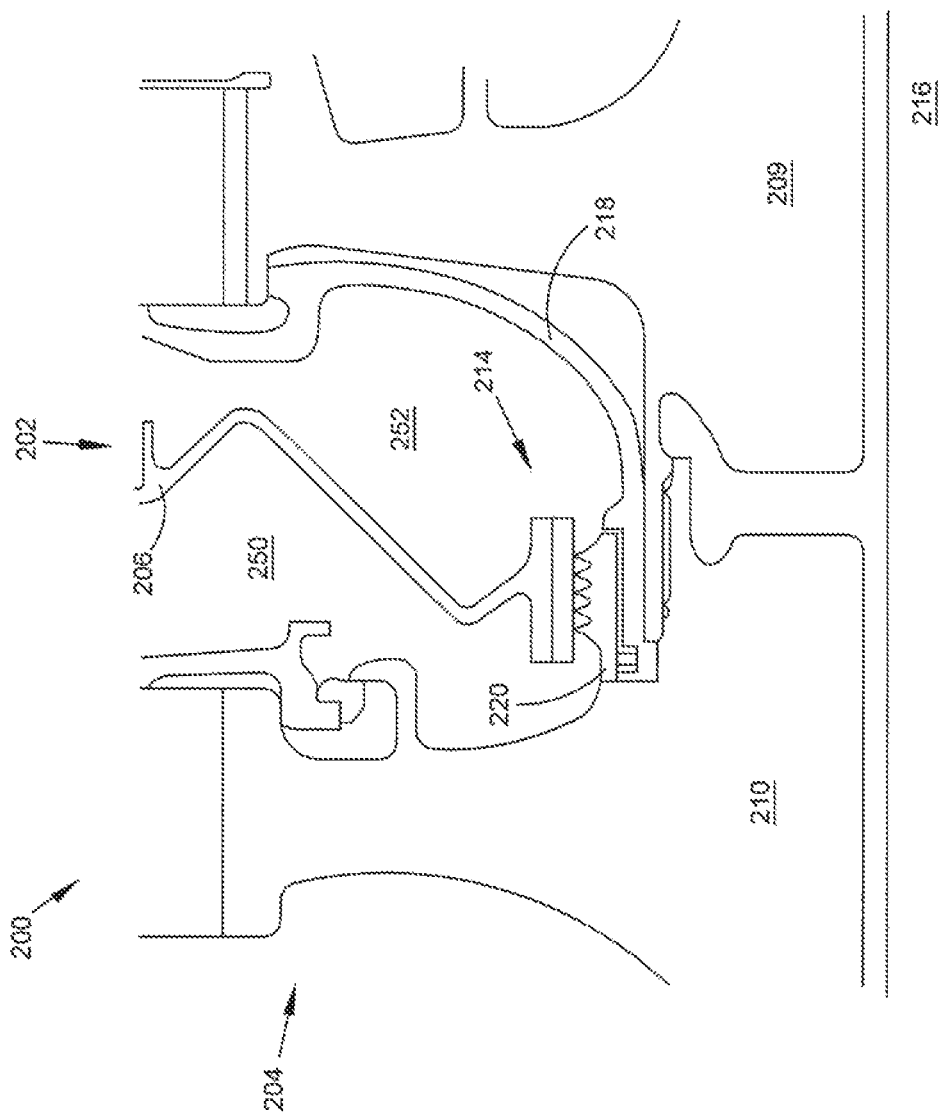
FIG. 2 is a cross-sectional side view of an interstage seal assembly in a turbine of a gas turbine engine according to some embodiments of the disclosed subject matter.
Figure 3:
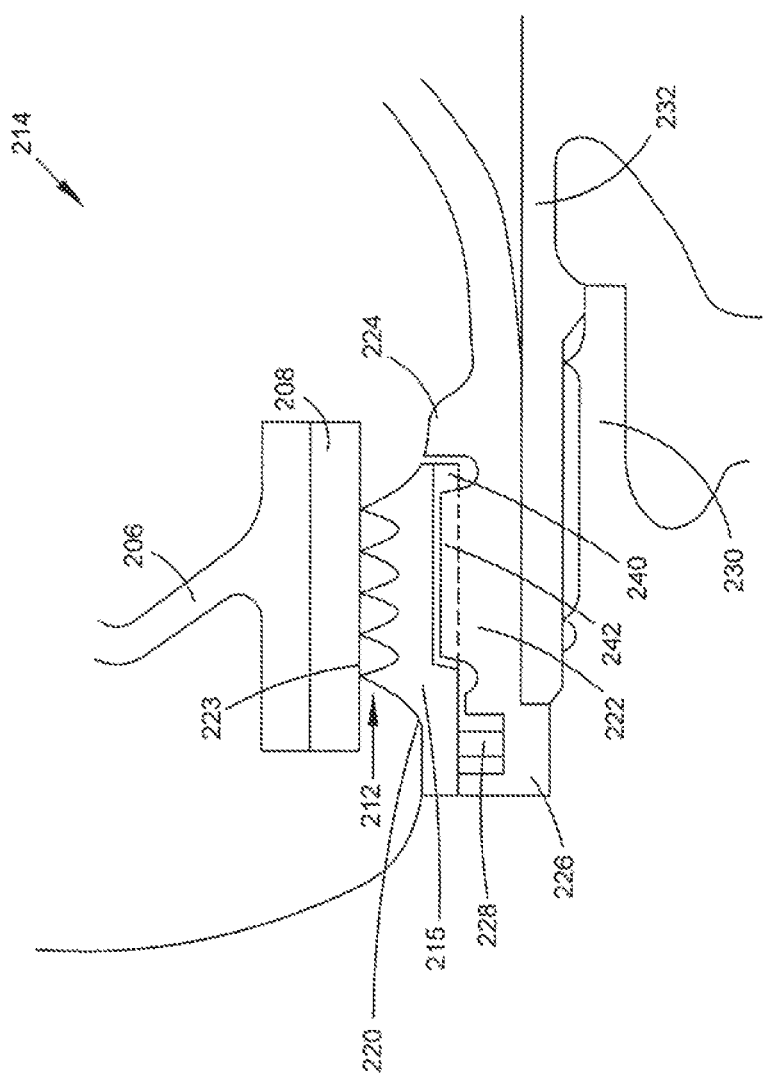
FIG. 3 is a detailed cross-sectional side view of an interstage seal assembly according to some embodiments of the disclosed subject matter.
Figure 4:
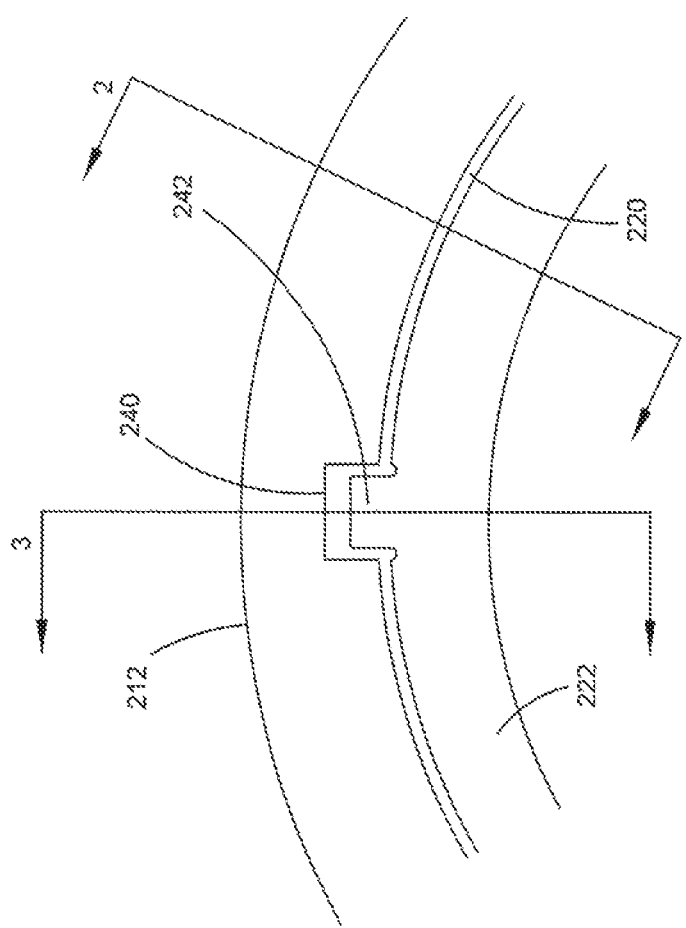
FIG. 4 is an axial cross-sectional view of a portion of the interstage seal assembly of FIG. 2 according to some embodiments of the disclosed subject matter.
Figure 5:
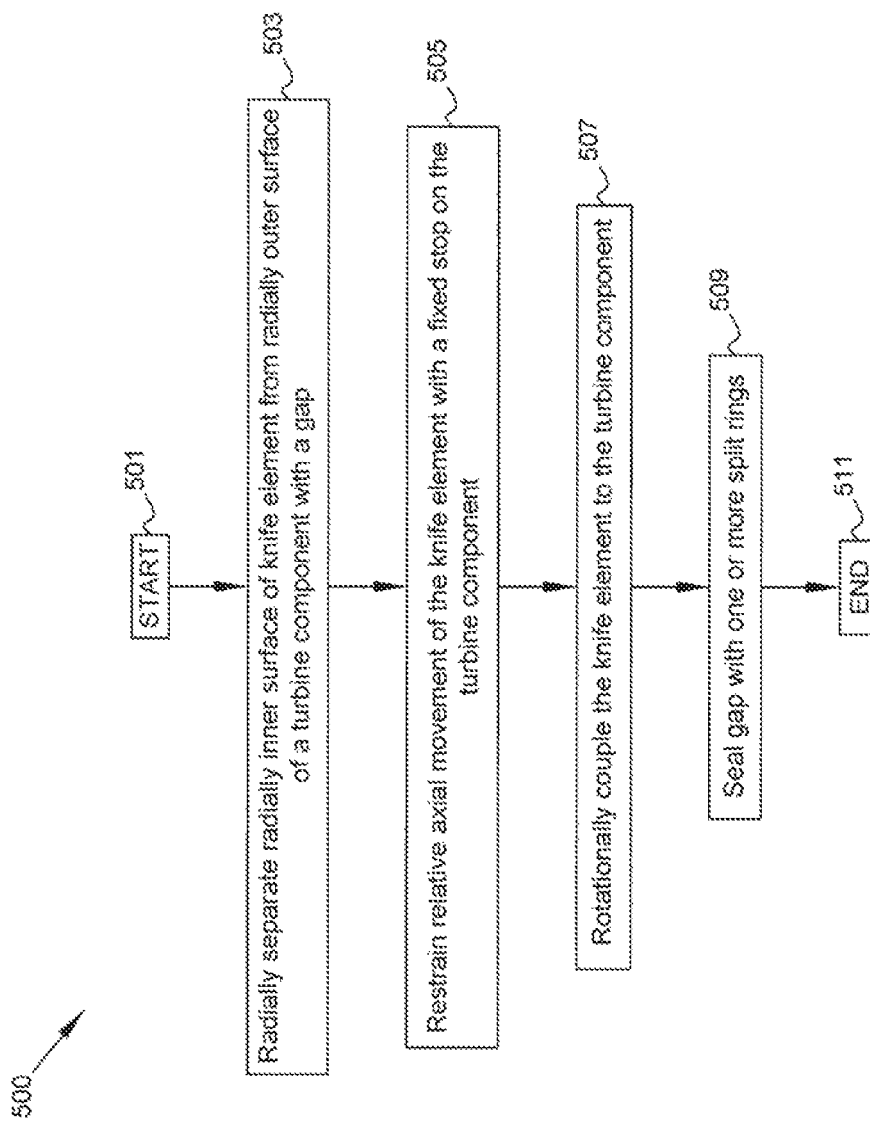
FIG. 5 is a flow diagram of a method according to some embodiments of the disclosed subject matter.
Figure 6:
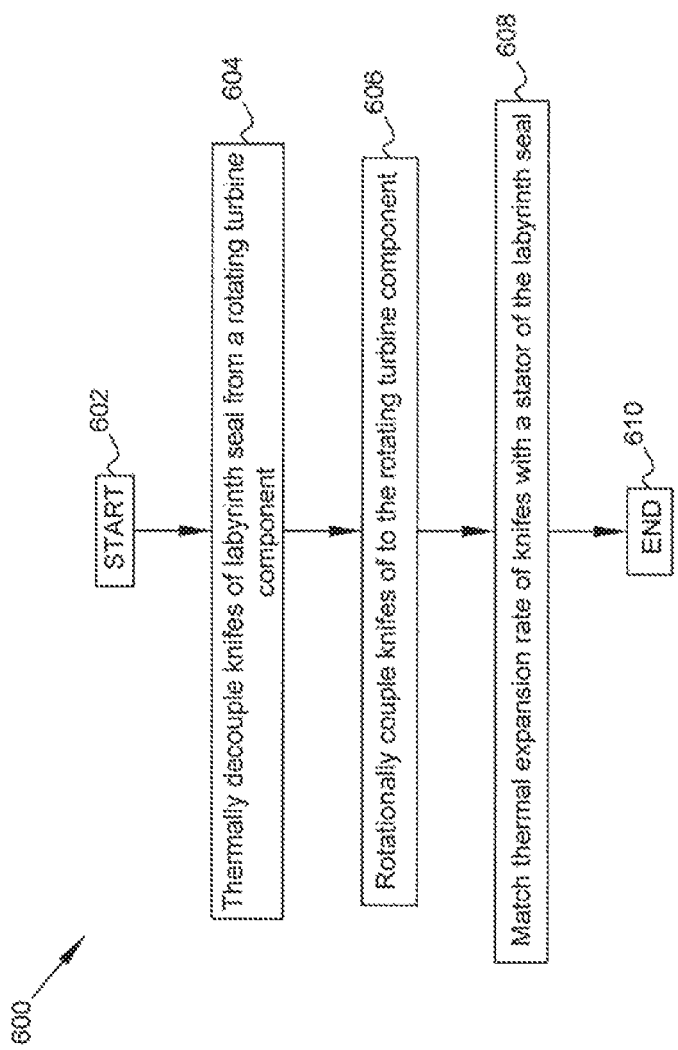
FIG. 6 is a flow diagram of a method according to some embodiments of the disclosed subject matter.

FIG. 2 is a cross-sectional side view of an improved interstage seal assembly 200 in a turbine of a gas turbine engine according to some embodiments of the present disclosure. FIG. 3 is a detailed cross-sectional side view of the interstage seal assembly 200 according to some embodiments of the present disclosure. FIG. 4 is an axial cross-sectional view of a portion of the interstage seal assembly 200 according to some embodiments of the disclosed subject matter. FIG. 4 additionally illustrates the location of the cross-sections of FIGS. 2 and 3, with the cross-section of FIG. 3 being taken through the key-keyway and the cross-section of FIG. 2 being taken at a circumferential offset from the key-keyway. Note that the separation shown in FIGS. 2, 3, and 4 between a knife element 220 and isolating arm 222 is exaggerated for the purposes of understanding the presently-disclosed subject matter (i.e. the separation is not drawn to scale). In fact, contact is generally expected between these elements.

Interstage seal assembly 200 may form a seal between two cavities, for example between two flowpath areas of two stages of a turbine engine. In the illustrated embodiment the interstage seal assembly 200 seals between a forward stage cavity 250 and an aft stage cavity 252.

According to the embodiment disclosed at FIGS. 2 and 3, an improved interstage seal assembly 200 comprises a stator portion 202 and a rotatable portion 204. Stator portion 202 is disposed radially inward from and coupled to a stator vane (not shown). Stator portion 202 comprises a stator 206 and a sealing member 208. Rotatable portion 204 comprises knife element 220. Knife element 220 comprises a plurality of knife edges 212 that, when placed in contact with the sealing member 208, form a labyrinth seal 214.

Knife element 220 is separated and thermally isolated from forward rotor disk 210 and a cover plate 218 of an adjacent rotor assembly that includes aft rotor disk 209. Rotor disks 209, 210 and cover plate 218 are rotatable about a shaft 216. Cover plate 218 comprises an isolating arm 222 that extends axially forward and is disposed between knife element 220 and rotor disk 210. In some embodiments a forward-extending arm 232 extends from an axially aft turbine component, illustrated as aft rotor disk 209, and provides further separation and structural support. Knife element 220 may therefore be rotationally coupled to either forward rotor disk 210 or aft rotor disk 209 and yet retain a degree of radial freedom relative to the forward rotor disk 210 and aft rotor disk 209. Knife element 220 is also thermally decoupled from forward rotor disk 210 and aft rotor disk 209.

Knife element 220 comprises a plurality of knife edges 212 extending from a base 215. Knife element 220 is annular, forming a concentric ring of a base 215 and knife edges 212 about the axis of rotation of the engine and/or shaft 216. The knife edges 212 are configured to engage sealing member 208 to form labyrinth seal 214. Knife edges 212 may also be referred to as teeth or fins. In some embodiments knife element 220 may be circumferentially segmented, such that a plurality of arcuate knife element members collectively form an annular knife element 220. Knife element 220 is axially constrained between the forward rotor disk 210 and aft rotor disk 209, and may be rotationally coupled to either forward rotor disk 210 or aft rotor disk 209.

Stator portion 202 comprises stator 206 and sealing member 208. Stator 206 is fixed in position and coupled to a stator vane (not shown) positioned radially outward from the labyrinth seal 214. Sealing member 208 is disposed opposite and radially outward from the plurality of knife edges 212 of knife element 220. Sealing member 208 comprises a radially inner surface 223 configured to contact and interact with the plurality of knife edges 212 to create a seal.

Isolating arm 222 extends from cover plate 218 and comprises a stop 224 and an end 226. Stop 224 is configured to engage knife element 220. End 226 comprises a groove 227 that is configured to retain a piston ring 228. The piston ring 228 seals between the isolating arm 222 and the knife element 220.

In some embodiments a forward-extending arm 232 extends axially forward from aft rotor disk 209 and is disposed between the knife element 220 and isolating arm 222 on one side, and the forward rotor disk 210 on the other. In some embodiments the forward rotor disk 210 may comprise an aft-extending arm 230 that extends axially aft to provide structural support to the interstage seal assembly 200.

In some embodiments a piston ring 228 seals between knife element 220 and isolating arm 222.

In some embodiments the axially forward turbine component, illustrated in FIG. 2 as forward rotor disk 210, may be a cover plate, bearing, shaft, or spacer. Similarly, in some embodiments the axially aft turbine component, illustrated in FIG. 2 as aft rotor disk 209, may be a cover plate, bearing, shaft, or spacer.

In some embodiments the interaction between isolating arm 222 and knife element 220 is government by a key and keyway system. As shown in FIG. 4, in some embodiments isolating arm 222 may have one or more keys 242 extending radially outward at one or more locations about the circumference of the isolating arm 222. Knife element 220 may have one or more keyways 240 configured to correspond to a respective key 242. The key-keyway contact prevents circumferential displacement of the knife element 220 relative to the isolating arm 222. In other words, the interaction of a key 242 with a keyway 240 ensures that the knife element 220 is rotationally coupled to the isolating arm 222 in a manner that the knife element 220 and isolating arm 222 rotate together without relative slippage.

In some embodiments, one or more split rings (e.g. piston ring 228) may be disposed radially between knife element 220 and one or more of the isolating arm 222, forward rotor disk 210, and aft rotor disk 209. Split rings may be coaxial with knife element 220 and maintain a seal between the knife element 220 and isolating arm 222 as the knife element 220 expands and contracts.

During operation, stator portion 202 and rotatable portion 204 are heated by the exhaust gases passing through the turbine. As these portions 202, 204 are heated they expand. Since the knife element 220 is separate and thermally isolated from the forward rotor disk 210 and other components, the forward rotor disk 210 and other components will not draw heat away from knife element 220 at nearly the same rate as found in prior art configurations. Knife element 220 and sealing member 208 have similar thermal capacity and thus expand at approximately the same rate. This allows for knife edges 212 to remain in contact with sealing member 208 and thus for the labyrinth seal 214 to be maintained from cold start through to hot operations. The mass of the knife element 220 is preferably less than the mass of either forward rotor disk 210 or aft rotor disk 209. The thermal capacity of knife element 220 is preferably substantially less than the thermal capacity of either forward rotor disk 210 or aft rotor disk 209.

During cooldown, the similar thermal capacity of knife element 220 and sealing member 208 will allow for similar rates of contraction and thus prevent damage to either component.

During operation, centrifugal forces and the expansion of knife element 220 tends to move knife element 220 radially outward and away from isolating arm 222. This separation causes a gap (not pictured in FIGS. 2, 3, and 4) to form between knife element 220 and isolating arm 222. Piston ring 228 provides a seal between the knife element 220 and isolating arm 222 when they are separated. The seal formed by piston ring 228 against knife element 220 is a static seal as the knife element 220 and isolating arm 222 are rotating together at a common rotational velocity.

The present disclosure additionally provides a method 500 of thermally decoupling a labyrinth seal from a turbine component. The method 500 begins at block 501 and then proceeds to block 503 where a radially inner surface of the labyrinth seal is radially separated from a radially outer surface of a turbine component with a gap. The radially inner surface of the labyrinth seal may be the radially inner surface of a knife element. The radially outer surface of the turbine component may be the radially outer surface of the isolating arm. The gap may be an air gap.

At block 505 relative axial movement of the labyrinth seal is restrained with a fixed stop on the turbine component. At block 507 the labyrinth seal and the turbine component are rotationally coupled such that the radial movement of the labyrinth seal is unrestrained by the turbine component.

In some embodiments the method 500 proceeds to block 509, where the gap between the labyrinth seal and the turbine component is sealed with one or more split rings. The method ends at block 511.

In some embodiments the step of rotationally coupling the labyrinth seal comprises locating a plurality of keys and corresponding keyway circumferentially about the labyrinth seal and the turbine component. The keys and keyways may be oriented longitudinally within planes containing the axis.

A further method 600 is provided of maintaining a labyrinth seal in a dynamic temperature environment. The method 600 beings at block 602. At block 604 the knifes of the labyrinth seal are thermally decoupled from a rotating turbine component.

At block 606 the knifes of are rotationally coupled to the rotating turbine component, and a block 608 the thermal expansion rate of the knifes is substantially matched with the expansion rate of the stator of the labyrinth seal. The knifes and the rotating turbine component may be configured to allow relative radial movement. The turbine component may be one of a rotor disc, a cover plate, a bearing, a shaft and a spacer. Method 600 ends at block 610.

In some embodiments the step of thermally decoupling knifes of the labyrinth seal comprises the step of providing an air gap between the radial inner surface of the knifes and the radial out surface of the rotating turbine component. In some embodiments the step of matching the thermal expansion rate is a function of at least thermal coefficient of expansion and total thermal capacity of the respective knifes and stator.

The presently disclosed interstage seal assembly and methods of interstage sealing provide numerous advantages over the prior art. By decoupling the labyrinth seal from a rotor disk and/or cover plate, axial clamp on the seal is eliminated and transient response of the labyrinth seal is improved. The probability of a failure of the labyrinth seal due to separation of knife edges from the sealing member is decreased since the knife edges and sealing member are better able to expand and contract together. Similarly, the probability of knife edge damage is greatly reduced. In particular the likelihood of knife edge cracking due to rub, and the resulting potential for high energy uncontained debris that pose a safety hazard to the engine is greatly reduced. Maintenance of the labyrinth seal is also improved; by decoupling the knife element from a rotor disk and/or cover plate, the knife element is able to be replaced without replacement of the entire rotor disk and/or cover plate. Maintenance is thus less expensive and, in most cases, easier to perform.

Although examples are illustrated and described herein, embodiments are nevertheless not limited to the details shown, since various modifications and structural changes may be made therein by those of ordinary skill within the scope and range of equivalents of the claims.

We claim:

1. A labyrinth seal system comprising:
    a plurality of teeth radially extending from a base, the plurality of teeth and base forming a concentric ring about an axis;
    a fixed stator disposed opposite and radially outward from the plurality of teeth, the fixed stator having a radially inner surface configured to interact with the plurality of teeth to create a seal between two cavities;
    an axially forward turbine component and an axially aft turbine component;
    the concentric ring constrained axially between the forward turbine component and the aft turbine component and rotationally coupled to one of the forward or aft turbine components; wherein the concentric ring has a degree of freedom in the radial direction with respect to the forward and aft turbine components.

2. The system of claim 1, wherein the concentric ring is thermally decoupled from the forward and aft turbine components, the concentric ring rotating about the axis relative to the fixed stator, and the forward and aft turbine components rotate about the axis with respect to the fixed stator.

3. The system of claim 1, wherein one of the forward and aft turbine components are selected from the group consisting of rotor disc, cover plate, bearing, shaft and spacer.

4. The system of claim 1, wherein the concentric ring is rotationally coupled to one of the forward or aft turbine components with a key and keyway arrangement.

5. The system of claim 1, further comprising a plurality of coaxial split rings engaged radially between the base and one of the forward and aft turbine components.

6. The system of claim 5, wherein the plurality of coaxial split rings are retained within a groove in the one of the forward and aft turbine components.

7. The system of claim 4, further comprising a plurality of keys and respective keyways distributed circumferentially about the coaxial ring and one of the forward and aft turbine components.

8. The system of claim 1, wherein the mass of the concentric ring is substantially less than the mass of the one of the forward and aft turbine components.

9. The system of claim 1, wherein the base comprises a radially inner surface oppositely disposed from an outer radial surface of the one forward and aft turbine components.

10. The system of claim 1, wherein the forward turbine component is a rotor disc and the aft turbine component is a cover plate.

11. The system of claim 1, wherein the thermal capacity of the concentric ring is substantially less than the thermal capacity of the one forward and aft turbine components.

12. A method of thermally decoupling a labyrinth seal from a turbine component comprising:
    radially separating an inner radial surface of the labyrinth seal from an outer radial surface of a turbine component with a gap;
    restraining relative axial movement of the labyrinth seal with a fixed stop on the turbine component; and
    rotationally coupling the labyrinth seal to the turbine component;
    wherein the radial movement of the labyrinth seal is unrestrained by the turbine component.

13. The method of claim 12, further wherein the turbine component rotates about an axis relative to a fixed portion of the labyrinth seal.

14. The method of claim 12, wherein the gap is an air gap.

15. The method of claim 12, wherein the step of rotationally coupling the labyrinth seal comprises locating a plurality of keys and corresponding keyway circumferentially about the labyrinth seal and the turbine component.

16. The method of claim 15, wherein the key and keyways are oriented longitudinally within planes containing the axis.

17. The method of claim 12, wherein the labyrinth seal comprises:
    a plurality of teeth radially extending from a base, the plurality of teeth and base forming a concentric ring about an axis;
    a fixed stator disposed opposite and radially outward from the plurality of teeth, the fixed stator having a radially inner surface configured to interact with the plurality of teeth to create a seal between two cavities;
    wherein the turbine component includes an axially forward turbine component and an axially aft turbine component;
    the concentric ring constrained axially between the forward turbine component and the aft turbine component and rotationally coupled to one of the forward or aft turbine components; wherein the concentric ring has a degree of freedom in the radial direction with respect to the forward and aft turbine components.

* * * * *